Aug. 25, 1964
C. W. HANKS ETAL
3,145,436
FOCUSED ELECTRON-BEAM MELTING AND CASTING
Original Filed Dec. 28, 1959
3 Sheets-Sheet 2
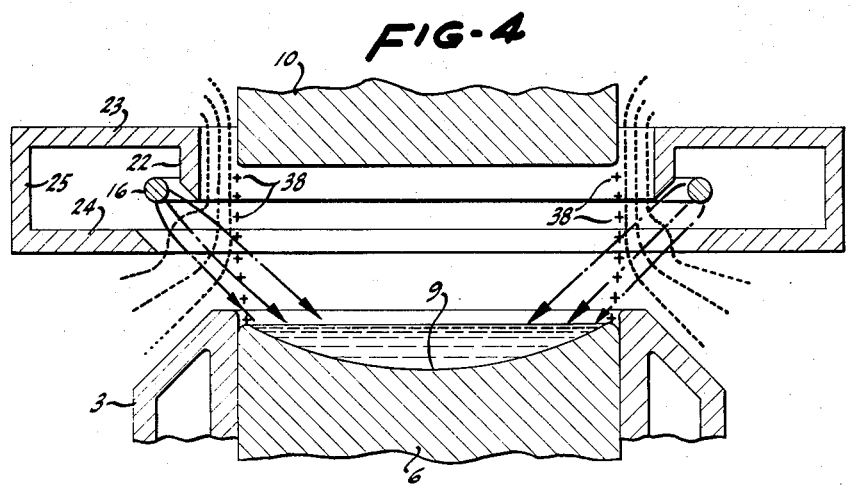
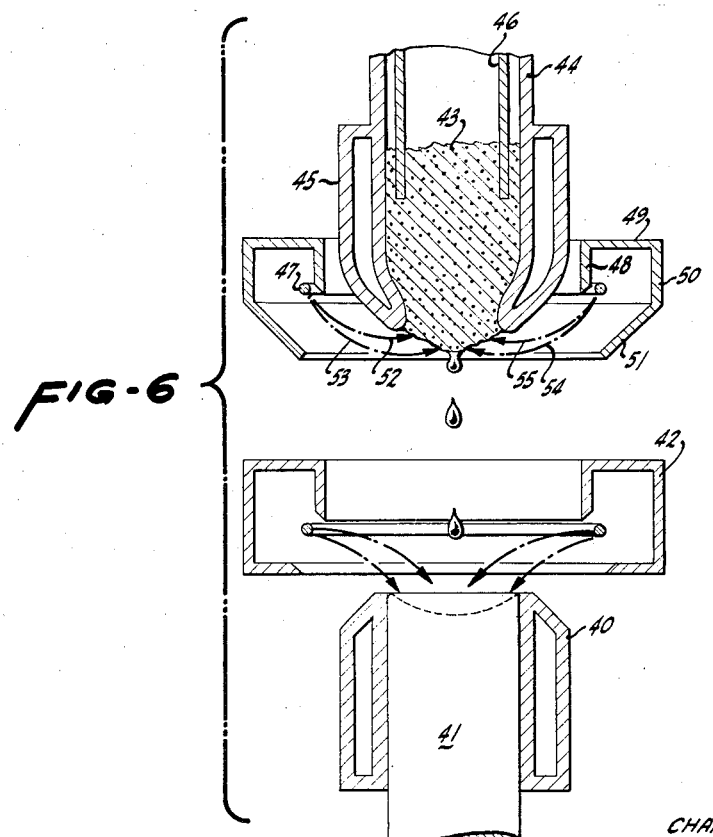
INVENTORS
CHARLES W. HANKS
HUGH R. SMITH, JR.
BY
*Lippincott & Ralls*
ATTORNEYS Aug. 25, 1964     C. W. HANKS ETAL     3,145,436
FOCUSED ELECTRON-BEAM MELTING AND CASTING
Original Filed Dec. 28, 1959     3 Sheets-Sheet 3
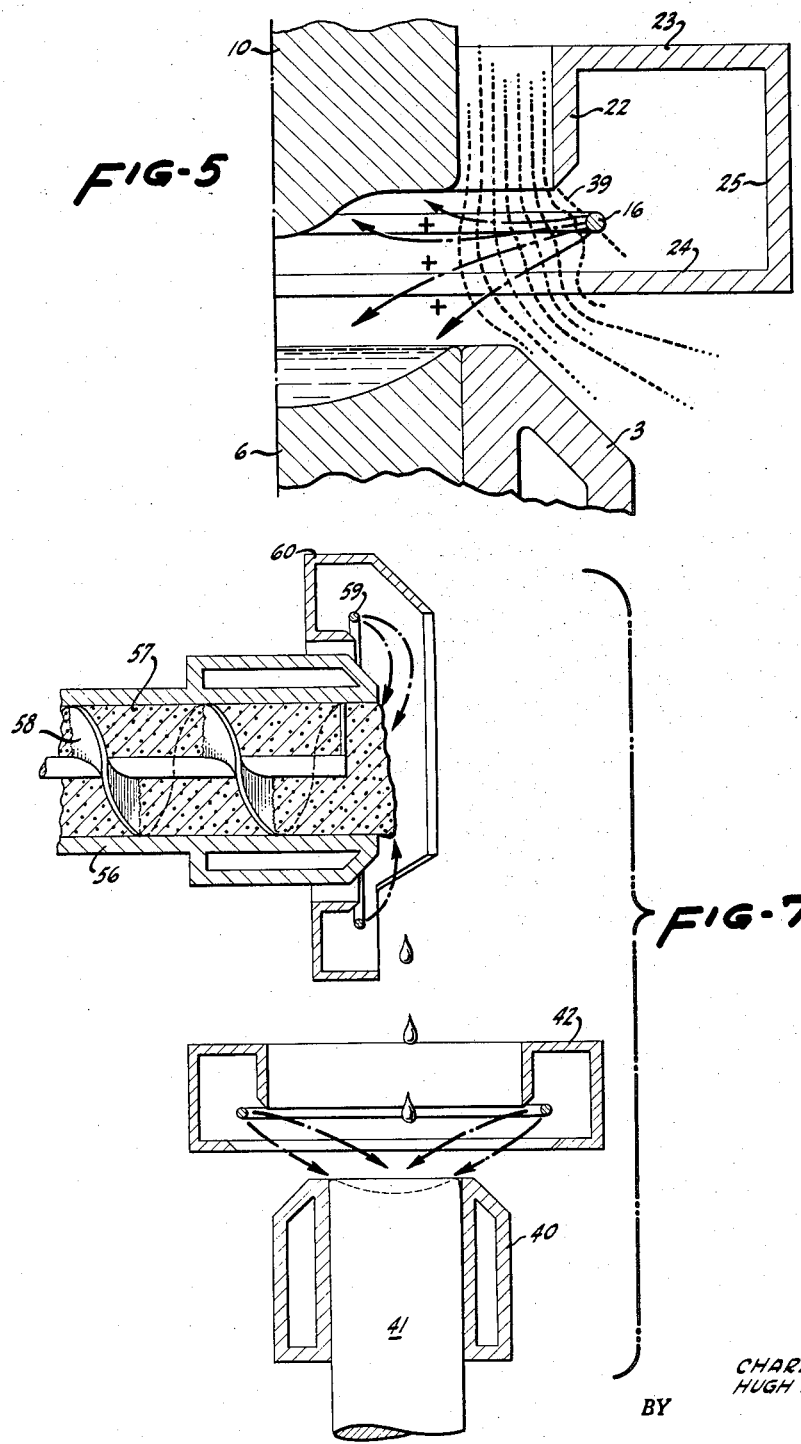
INVENTORS
CHARLES W. HANKS
HUGH R. SMITH, JR.
BY
Lippincott & Ralls
ATTORNEYS

United States Patent Office 3,145,436
Patented Aug. 25, 1964

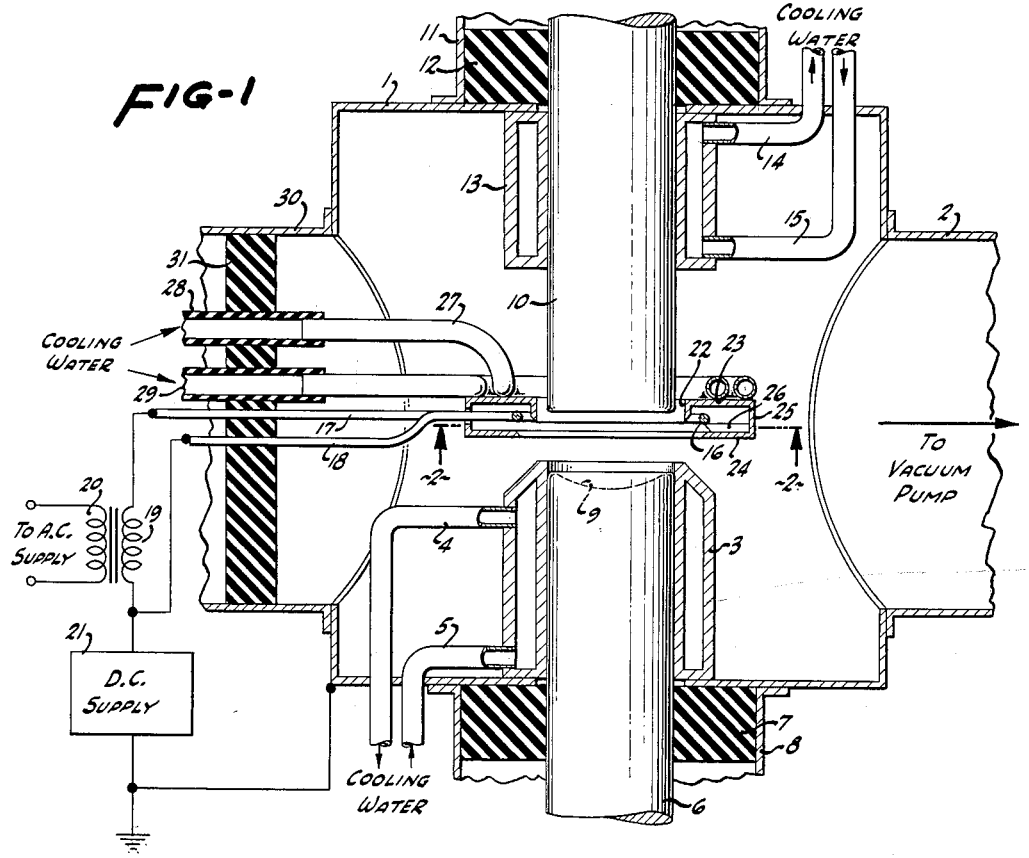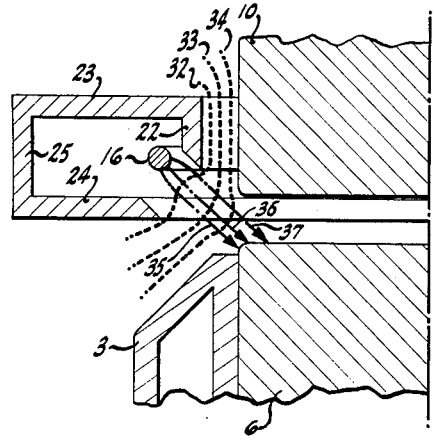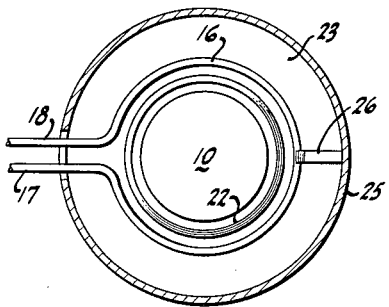

3,145,436
FOCUSED ELECTRON-BEAM MELTING
AND CASTING
Charles W. Hanks, Orinda, and Hugh R. Smith, Jr., Piedmont, Calif., assignors to Stauffer Chemical Company, New York, N.Y., a corporation of Delaware
Continuation of application Ser. No. 862,129, Dec. 28, 1959. This application Nov. 13, 1962, Ser. No. 239,393
10 Claims. (Cl. 22—57.2)

This application is a continuation of applicants' copending application Serial No. 862,129, filed December 28, 1959.

This invention relates to improvements in the construction and operation of electron-beam furnaces for melting and casting materials in a high vacuum.

As is shown in U.S. Patent 2,880,483, for example, it is known that high-vacuum melting and casting operations can advantageously include electron-bombardment heating for two purposes: one, to melt away the lower end of a consumable electrode of melt stock, and, two, to maintain a molten pool of material within the upper portion of the casting mold. In one form of the electron-beam furnace, sometimes called a single-gun furnace, the lower end of the consumable electrode is closely spaced above the open top of the casting mold and the same electron gun, consisting of an annular cathode and a focusing structure, supplies electrons that bombard both the consumable electrode and the molten pool within the casting mold. In another form, sometimes called a two-gun furnace, there is a greater spacing between the consumable electrode and the mold and two electron guns are provided: one gun for bombarding and melting away the consumable electrode, and another gun for bombarding and maintaining the molten pool within the upper portion of the casting mold.

The one-gun type is the more efficient, because the proximity of the two heated bodies reduces heat losses. The two-gun type may require 25% more electrical power to melt and cast the same amount of material. Also, the smaller distance between the melting zone and the molten pool in the one-gun type greatly reduces the amount of splashing caused by molten material dropping into the pool. However, difficulties arise as sizes and melting rates are increased, and particularly when the melt stock is an impure material that evolves large quantities of gaseous matter in melting. The evolved gases become ionized, and gas focusing of the electron beam causes preferential bombardment of the hottest anode region, which evolves the most gas. This may result in superheating and excessive bombardment of the melt stock in preference to the molten pool; the beam may cut channels in the melt stock, or climb up the sides of the consumable electrode, and in extreme cases the diversion of the beam away from the pool within the casting mold may cause the pool to freeze. Heretofore, these difficulties made it generally necessary to use the two-gun arrangement for the initial melting of high-impurity materials, and to some extent limited the maximum practical melting rates and the diameters of the consumable electrode and cast ingot.

The present invention greatly moderates the above limitations and disadvantages by means of an improved focusing structure comprising a focusing electrode, generally cylindrical, having an edge or end of somewhat smaller diameter than the annular cathode and approximately coplanar with the cathode. The melt stock extends into this cylindrical focusing electrode in spaced coaxial relation therewith. The focusing electrode restricts the electron beam to one side of the cathode plane and, the consumable electrode of melt stock being brought in from the other side with the exposed end that is to be melted away adjacent to the cathode plane, excessive diversion of the electron beam to the melt stock is prevented. In fact, under certain conditions of operation hereinafter described, the melt stock may be completely withdrawn from the primary electron beam, and melting may proceed through heating of the melt stock from the nearby hot, molten pool and the ionic plasma that forms above it. By this means, use of the single-gun furnace may be extended to larger-scale operations and to the initial melting of more impure materials.

Two-gun furnaces are still preferable for certain operations, such as the melting of materials that evolve unusually large amounts of gaseous matter, or that melt unevenly with much spattering, and the initial melting of materials supplied in powder or lump form. The improved focusing structure is very advantageous in this case also, because it permits placing the cathode out of alignment with the melting surface, which provides a more open configuration for the escape of evolved gases and increases cathode life by reducing the deposition of splashed and spattered matter on the cathode and focusing structure.

A better understanding of the invention may be had from the following illustrative description and the accompanying drawings, in which:

FIG. 1 is a somewhat schematic vertical section of an improved single-gun furnace;

FIG. 2 is a horizontal sectional detail taken along line 2—2 of FIG. 1;

FIG. 3 is a detail showing a portion of the same furnace as in FIG. 1, drawn to a somewhat larger scale and representing a typical relation of parts used, according to a preferred method of startup, electron paths being represented by arrows and electrical equipotential surfaces being represented by broken lines;

FIG. 4 is a similar detail showing a typical relation of parts during operation, the positive ion sheath at the boundary of the plasma that forms above the molten pool being represented by + marks;

FIG. 5 is a similar detail showing a modification of the gun structure employed in the melting of materials that evolve relatively little gaseous matter;

FIG. 6 is a fragmentary, vertical section of an improved two-gun furnace useful in the initial melting of material supplied in powder form; and FIG. 7 is a fragmentary, vertical section of another two-gun furnace useful for the initial melting of powdered material.

In FIG. 1, an evacuable enclosure 1 is provided with a large outlet duct 2, which connects to vacuum pumps of adequate capacity for maintaining a high vacuum (preferably less than one micron Hg absolute pressure) within the enclosure 1 at all times during operation of the furnace. Within the vacuum enclosure, an open-ended, annular, water-cooled, copper casting mold 3 is disposed with its axis vertical, as shown. Cooling water is continuously circulated through supply pipes 4 and 5 and the water jacket of mold 3. Molten material is continually fed into the open top of mold 3, as hereinafter explained, and as the melt solidifies the cast ingot 6 is continually withdrawn through the open bottom of the mold. A conventional vacuum seal 7 may be provided, and preferably the ingot 6 is withdrawn into an air lock which may also be maintained at high vacuum. A fragment of the air lock is represented at 8. It being conventional, no further representation or description thereof is considered necessary.

The production of sound, void-free castings requires that an adequate molten pool of the material cast be maintained at the top of the cast ingot 6. This pool is kept molten by continuous electron bombardment, as hereinafter described; it is held within a skull that forms at the top of the cast ingot. The boundary between the liquid pool and the solidified cast material is represented in the drawing by broken line 9.

Molten material is continually supplied into the open top of the casting mold by melting away the lower end of a consumable electrode 10 of the melt stock. In this particular case, the melt stock is a bar of approximately the same diameter as the cast ingot. It may have been formed by a similar, previous casting operation, and is now being remelted and recast for the purpose of further purification or to otherwise improve the quality of the ingot. The consumable electrode 10 has its exposed lower end, which is to be melted away, in vertical alignment with the open top of the casting mold 3, so that molten material will drop into the casting mold as the consumable electrode melts. The electrode 10 preferably is introduced through a conventional air lock 11, and a conventional vacuum seal 12 may also be provided, if desired. The consumable electrode is held in position, in vertical alignment with the casting mold, by means of an annular guide collar 13 which may advantageously be water-cooled by continuously circulating cooling water through the pipes 14 and 15 and the water jacket of the guide collar.

The electron gun consists essentially of an annular cathode 16 and a focusing structure that substantially surrounds it. As is best shown in FIG. 2, the cathode 16 preferably is a circular loop of wire, usually of tungsten, connected to two leads 17 and 18 for supplying heating and emission currents thereto. The cathode is heated to thermionic emission temperature by passing alternating current therethrough, e.g., by means of a transformer having a secondary 19, connected between leads 17 and 18, and having a primary 20 connected to any appropriate alternating-current supply. Casting mold 3 and consumable electrode 10 are preferably maintained at ground potential by connection to the grounded vacuum enclosure 1, and the cathode is maintained at a potential several thousand volts negative with respect to ground by means of the D.C. power supply 21.

The focusing structure may be most easily understood by considering its several parts separately, even though, in practice, these parts may be welded or otherwise permanently connected, or be made from a single piece of metal. The most significant part of the focusing structure, in respect to the present invention, is the focusing cylinder 22, which is of somewhat smaller diameter than the annular cathode 16, as shown. Cylinder 22 is coaxial with cathode 16, and the lower end of the focusing cylinder is approximately coplanar with the cathode. The exact relation between the lower end of the focusing cylinder and the cathode plane depends to some extent upon the type of material being melted: in the melting of materials that evolve relatively little gaseous matter, it is preferable to have the focusing cylinder end somewhat above the cathode plane, so that the cathode is in a somewhat more exposed position whereby the electric field can more readily accelerate electrons away from the cathode surface. With materials that evolve great quantities of gaseous matter, the end of the focusing cylinder may be brought somewhat below the cathode plane; this shields the cathode to a considerable extent against vapors, splashed and spattered materials, and greatly increases cathode life. The relatively extensive plasma and copious ionization that accompany high rates of gas evolution so modify the electric fields that strong currents are obtained from the hidden cathode. In general, lines drawn between the lower edge of the focusing cylinder and the cathode will intersect the cathode plane at an angle not exceeding 45°. For purposes of this specification, the lower end of the focusing cylinder and the cathode are considered to be approximately coplanar within this range.

The lower end of consumable electrode 10 and the molten pool within the upper portion of casting mold 3 are both at a moderately high positive potential relative to the cathode 16, so that electrons emitted by the cathode are attracted toward the lower end of electrode 10 and the molten pool for bombarding and heating the same. The focusing cylinder 22 prevents excessive diversion of the electron beam to the consumable electrode, and assures that at least a majority of the beam will bombard and heat the molten pool within the casting mold.

In the embodiment illustrated, the evacuable enclosure 1 is also at a high positive potential relative to the cathode, and therefore it is desirable that means be provided to minimize useless and wasteful bombardment of the furnace walls by the emitted electrons. For this purpose, the focusing structure has other parts that extend from the upper end of focusing cylinder 22 over, around, and under the cathode 16, as shown, forming a focusing ring of inwardly opening, channel-shaped cross-section. These other parts may conveniently comprise a horizontal upper focusing plate 23, a horizontal lower focusing plate 24, and an outer cylinder 25 coaxial with and encircling the cathode. All of the parts 22, 23, 24, and 25 of the focusing structure are electrically conductive and connected together. In fact, they may be made of a single piece of metal or of several pieces welded together, and therefore are at the same electric potential. A metal bar or strap 26 serves the dual purposes of helping to support the cathode and providing an electrical connection between the cathode and focusing structure so that the focusing structure is maintained at cathode potential. Other supports (not shown) may be provided at intervals around the annular cathode to prevent excessive sagging thereof when hot, but these other supports must be insulated from the focusing structure to prevent shorting out the cathode heating current.

Additionally, it may be desirable to cool the focusing structure, because electrical breakdown is more likely when hot areas exist. For this purpose a cooling pipe 27 is provided, and is brazed or welded to the focusing structure for providing good thermal conduction therebetween. Because the metal pipe 27 is at a moderately high negative potential relative to ground, it is connected to a cooling water source through pipes 28 and 29 of insulating material, and cooling water of low electrical conductivity is circulated through these pipes.

Electron guns constructed as herein described are reasonably long-lived; nevertheless, it is occasionally necessary to replace the electron guns, either because of an excessive buildup of deposited matter thereon, or to change to a gun of another configuration when a different type of material is to be melted and cast. To facilitate changing the electron gun, the gun and connections thereto are introduced into the evacuated enclosure through an air lock 30, which is schematically illustrated as being provided with a seal 31 to assist in maintaining the vacuum within the evacuated enclosure.

It will be noted that the focusing structure completely surrounds the annular cathode, except for an annular gap between the lower end of focusing cylinder 22 and the inner edge of focusing plate 24. This provides a cone-like electron beam directed inwardly and downwardly into the open top end of the casting mold. Not only is the beam well focused, but also the cathode is hidden to a large extent from the vapors and spattered material evolved during melting operations.

The cathode is also shielded to a considerable extent from the electric field existing between anode and focusing structures; therefore, there is a tendency for the initial current to be limited to small values by electronic space-charge, and some difficulty might be expected in initiating the flow of a large enough current to start the melting operation and to form the ionic plasma which will overcome the space-charge limitation during full power operation.

The starting problem can be solved by the method of start-up illustrated in FIG. 3. A stub or starting ingot 6 of solid material is inserted into the casting mold with its upper end approximately at the upper end of the mold. The consumable electrode 10 is lowered until its exposed lower end extends substantially below the lower end of focusing cylinder 22. The lower end of electrode 10 then acts a false anode, which intensifies the electric field in the vicinity of cathode 16 and permits a substantially larger current to flow away from the cathode. The actual shape of the field, however, is such that few of the primary electrons actually strike electrode 10. Most of them bombarded the top of ingot 6 and heat it sufficiently to form a molten pool in the upper portion of the casting mold. This may be better understood by noting the broken lines 32, 33, and 34 which represent equipotential surfaces in the high-voltage electric field. It will be noted that the lowering of electrode 10 forces these equipotential surfaces outward toward the cathode 16, and thus increases the voltage gradient at the cathode and provides for the flow of a larger emission current despite the existing space-charge limitations. On the other hand, the field in the vicinity of the cathode is highly curved, as shown, and this focuses the electron paths, represented by arrows 35, 36, and 37, onto the top of the stub ingot 6.

Once a molten pool has been formed at the top of ingot 6, there is considerable heat transfer to the lower end of consumable electrode 10. This heat transfer may take place through the action of various agencies, i.e., radiation, secondary electron bombardment, gaseous convection and conduction, diversion of the primary beam through gas focusing, and others. In any event, the lower end of consumable electrode 10 is soon heated to melting, and as the metal melts it drips into the molten pool within the upper portion of the casting mold. Furthermore, gaseous matter is now being evolved at a considerable rate, and this matter ionizes to form a plasma above the molten pool.

After operations have started as described above, the ingot 6 can be retracted somewhat, and the top of the molten pool may, if desired, be lowered to as much as one-half inch below the top of the casting mold. During actual operations it is actually desirable to slightly oscillate ingot 6 up and down at intervals, thus moving the molten pool up and down, as is more fully disclosed and claimed in the co-pending application of Harry G. BVraun, Serial No. 27,948, field May 9, 1960, and assigned to the same assignee as the present application. This draws into the pool any spattered material that may have accumulated on the walls of the mold, and facilitates the formation of ingots with smoother surfaces. The consumable electrode 10 may now be raised so that its lower end is above the lower end of the focusing cylinder, and quite above the apparent upper edge of the primary electron beam. The ionic plasma may fill the space between the molten pool and the lower end of the consumable electrode. This plasma is surrounded by a positive ion sheath represented by the + marks 38, and being a good conductor, the entire plasma is approximately at anode potential. Hence, the equipotential surfaces of the high-voltage electric field are forced outward by the plasma toward the cathode; additionally, postive ions travel from the ion sheath toward the cathode and focusing structure, and these ions at least partly neutralize the electronic space-charge. As a result, a strong current continues to flow between the cathode and the molten pool. The lower end of the consumable electrode continues to melt away, apparently because of its proximity to the molten pool rather than by direct electron bombardment. The rate of melting can be regulated by raising and lowering the end of electrode 10 from time to time, as required.

In the melting of materials that evolve relatively little volatile matter, it has been found that continued bombardment of the melt stock with primary electrons is necessary in order to maintain melting. In this case the cathode plane is lowered slightly relative to the focusing cylinder, as shown in FIG. 5, so that the lower end of focusing cylinder 22 lies above the plane of cathode 16. As illustrated in FIG. 5, a line 39 drawn from the lower edge to the focusing cylinder of the cathode will intersect the cathode plane at an angle of approximately 45°. This limits the upper edge of the electron beam substantially to the plane of the cathode; in other words, the beam is somewhat broader than with the previous embodiment, and extends from an approximately horizontal upper edge to a conelike lower edge, so that the majority of the beam is still directed downward into the molten pool within the casting mold. The upper edge of the beam remains quite sharp, and the melting of consumable electrode 10 can be controlled quite accurately simply by controlling the rate at which the consumable electrode is lowered. If the consumable electrode is allowed to remain stationary for a time, the beam will melt away its lower end approximately level with the plane of the cathode. Melting will then stop until the electrode is lowered again. Preferably, the consumable electrode 10 is lowered at a fairly uniform rate to provide uniform melting of the melt stock.

FIG. 6 is a fragmentary representation of a two-gun furnace. Because the vacuum enclosure and system are identical to that for a one-gun furnace, the cooling systems are similar in principle, and the electrical supply circuits are identical but duplicated, there being a separate supply for each gun, these parts have not been shown in FIG. 6. The casting mold 40 is substantially identical to the mold 3 described above, and within it there is maintained a molten pool atop the solidified ingot 41. This molten pool is maintained by electron bombardment from an electron gun 42, which may be substantially identical to the gun utilized in the single-gun furnace. The focusing cylinder limits the electron beam to the underside of the cathode plane, and thus aids in preventing interaction between the two guns.

The melt stock 43 is supplied in the form of a powder through a vertical feed tube 44 having a water-jacketed, open lower end 45. A tubular tamper 46 compresses the powder, and the combination of heat and pressure causes sintering of the powder into a plug that is held in place in the open bottom end of the feed tube by a slight constriction of its diameter.

Melting is accomplished by means of a second electron gun composed of an annular cathode 47 and a focusing structure that forms a conelike beam directed inwardly and downwardly from the cathode. The focusing structure is comprised of a focusing cylinder 48, of somewhat smaller diameter than the annular cathode, having its lower end approximately coplanar with the cathode. Connected to the upper end of cylinder 48 is a horizontal plate 49 which connects to an outer cylinder 50 having an inwardly extending lower flange 51, so that the whole forms a structure surrounding the cathode except for the annular gap through which the electron beam passes.

The melt stock and its supporting feed tube extend in coaxially spaced relation to the focusing cylinder 48, with the exposed lower end of the melt stock somewhat below the plane of cathode 47. The feed tube 44 and the melt stock thereon are of course connected to the grounded vacuum enclosure and thereby maintained at ground potential, while the cathode 47 is maintained at a moderately high negative potential by means of the D.C. power supply. As a result, there is an electric field that attracts the electrons emitted by the cathode toward the feed tube and toward the exposed lower end of the melt stock. However, the downward direction given to the electrons by the focusing structure prevents any great number of them from actually striking and bombarding the feed tube, and a majority of the electrons emitted from cathode 47 therefore proceed along the paths represented by arrows 52, 53, 54, and 55 and bombard the exposed lower end of the melt stock.

Once melting starts there is a considerable evolution of gaseous matter, and the formation of a plasma around the exposed lower end of the melt stock provides gas focusing which aids greatly in steering the electrons to the melting surface. Bombardment of the feed tube is further inhibited by its relatively low temperature maintained by the water jacket surrounding its lower end. The arrangement shown in FIG. 6 is quite advantageous for the melting of powders and the like, since no adjustment of the feed tube position is required, and furthermore, there is a fairly open configuration which permits the easy escape of the evolved gaseous matter. The cathode is completely out of line with vapors and spattered matter, and in consequence, its operating life is long.

FIG. 7 represents another two-gun furnace, which is useful for melting powder or lumpy materials. The lower part of this furnace is identical to that shown in FIG. 6, and therefore its parts bear the same reference numbers. The upper part differs chiefly in that the feed tube 56 is horizontal, and the melt stock 57 is forced through the feed tube by means of a screw conveyor 58. The upper electron gun is coaxial with the feed tube, and therefore, in this case, has a horizontal axis rather than a vertical one. The gun consists essentially of the annular cathode 59 and a focusing structure 60, which may be identical to the focusing structure of the upper gun in the furnace shown in FIG. 6 except that its axis has been turned to a horizontal position and a segment at the bottom of the focusing structure has ben cut away, as shown, to provide an unobstructed path for molten material to drop from the melting surface at the open end of the feed tube into the open upper end of the casting mold.

It will be understood that this invention in its broader aspects is not limited to specific embodiments herein described, and that its scope is to be determined from the appended claims.

We claim:

1. An electron-beam furnace comprising an evacuable enclosure, an annular focusing structure of inwardly opening channel-shaped cross-section, the structure being within the enclosure and including a first annular focusing plate, an outer cylinder secured at one end to the outer edge of the first plate, and a second annular focusing plate secured at its outer edge to the other end of the cylinder, an annular thermionic cathode disposed coaxially within the focusing structure, a focusing cylinder secured at one end to the inner edge of the first annular plate and extending toward the cathode, the other end of the focusing cylinder being of smaller diameter than the cathode and being approximately coplanar with the cathode, the inner edge of the second focusing plate being spaced substantially farther from the the plane of the cathode than the said other end of the focusing cylinder, means for supporting a body of material to be treated in axial alignment with the cathode, and electrical circuit means for supplying a negative potential to the focusing structure and cathode relative to the body.

2. An electron-beam furnace comprising an evacuable enclosure, an open-top casting mold within the enclosure, an annular focusing structure of inwardly opening channel-shaped cross-section disposed above and in vertical axial alignment with the open top of the mold, the structure being within the enclosure and including a first annular focusing plate, an outer cylinder secured at one end to the outer edge of the first plate, and a second annular focusing plate secured at its outer edge to the other end of the cylinder, an annular thermionic cathode disposed coaxially within the focusing structure, a focusing cylinder secured at one end to the inner edge of the first annular plate and extending toward the cathode, the other end of the focusing cylinder being of smaller diameter than the cathode and being approximately coplanar with the cathode, the inner edge of the second focusing plate being spaced substantially farther from the plane of the cathode than the said other end of the focusing cylinder, means for supporting a body of material to be treated in axial alignment with the cathode and extending into the focusing cylinder, and electrical circuit means for supplying a negative potential to the focusing structure and cathode relative to the body.

3. The method of electron-beam melting and casting in a high vacuum that comprises supporting a body of melt stock in vertical alignment above an open-top casting mold, maintaining a pool of molten material within the upper portion of said mold by directing a beam of electrons slantingly downward under said melt stock and into the open top of said mold while maintaining said body of melt stock above the upper edge of said beam, electrically shielding the body of melt stock from the beam of electrons so that at least a majority of the beam bombards and heats the molten pool within the mold, and maintaining the body of melt stock in such close proximity to said molten pool that the lower portion of said body continuously melts away as a result of heat transferred thereto and drips into said pool.

4. The method of electron-beam melting and casting in a vacuum that comprises supporting a body of melt stock with an exposed end that is to be melted away in vertical alignment above an open-top casing mold, providing an annular, electron-emissive cathode encircling said body, electrically shielding the body from the cathode focusing the electrons emitted by said cathode into a cone-like beam directed inwardly and longitudinally with respect to said body toward a point beyond said exposed end thereof, and applying an electrical potential between the body and cathode so that electrons in said beam are attracted by said exposed end and thereby diverted from their directed paths to bombard said exposed end.

5. An electron-beam furnace comprising an evacuable enclosure, an annular cathode within said enclosure, a focusing cylindrical electrode coaxial with said cathode, means for liquid cooling the focusing electrode, said focusing electrode having an edge of smaller diameter than said cathode and approximately coplanar with said cathode, means for supporting, in spaced, coaxial relation within said electrode, a body of melt stock with an exposed end that is to be melted away adjacent to the plane of said cathode, and electrical circuit means for maintaining said cathode and focusing electrode at a negative potential relative to said body of melt stock.

6. An electron-beam furnace comprising an evacuable enclosure, an annular cathode within said enclosure, a focusing cylinder coaxial with said cathode, said cylinder being of smaller diameter than said cathode and having an end approximately coplaner with said cathode, a feed tube for supplying and supporting a body of melt stock, said tube having an open end adjacent said end of the cylinder and extending into said cylinder and in spaced, coaxial relation thereto, and electrical circuit means for maintaining said cathode and focusing cylinder at a negative potential relative to said body of melt stock.

7. An electron-beam furnace comprising an evacuable enclosure, an open-top casting mold within said enclosure, a liquid-cooled feed tube having an open end positioned vertically above the open top of said mold, means for feeding melt stock through said tube to said open end thereof, a focusing cylinder encircling said feed tube in spaced, coaxial relation thereto, said cylinder having one end adjacent to said open end of the feed tube, an annular, thermionic cathode coaxial with said cylinder and tube, said cathode being of larger diameter than said cylinder and approximately coplanar with said one end thereof.

8. An electron-beam furnace comprising an evacuable enclosure, an open-top casting mold within said enclosure, a liquid-cooled vertical feed tube having an open lower end positioned in vertical axial alignment with and above the open top of said mold, means for feeding melt stock downward through said tube to said open end thereof, a focusing ring of inwardly opening, channel-shaped cross-section encircling the lower end of said feed tube and in spaced, coaxial relation thereto, an annular thermionic cathode coaxial with and within said focusing ring, a focusing cylinder encircling said feed tube in spaced, coaxial relation thereto, said cylinder being of smaller diameter than said cathode and having an upper end attached to said focusing ring and a lower end approximately coplanar with said cathode, and electrical circuit means for maintaining said ring, cathode, and cylinder at a negative potential relative to said melt stock.

9. An electron-beam furnace comprising an evacuable enclosure, an open-top casting mold within said enclosure, a liquid-cooled, horizontal feed tube having an open end positioned vertically above the open top of said mold, means for feeding melt stock through said tube to said open end thereof, a focusing ring of inwardly opening, channel-shaped cross-section encircling said open end of the feed tube and in spaced, coaxial relation thereto, a lower portion of said focusing ring being cut away to provide a free path for molten material dropping into said mold from said open end of the feed tube, an annular, thermionic cathode coaxial with and within said focusing ring, a focusing cylinder encircling said feed tube in spaced, coaxial relation thereto, said cylinder being of smaller diameter than said cathode and having one end attached to said focusing ring and the other end approximately coplanar with said cathode, and electrical circuit means for maintaining said ring, cathode, and cylinder at a negative potential relative to said melt stock.

10. The method of electron-beam melting and casting in a high vacuum that comprises filling an open-top casting mold with a material that evolves gaseous matter when melted, maintaining said mold at anode potential while directing a beam of electrons onto the material therein from a horizontal, uniplanar cathode positioned above the mold, restricting the upper edge of said beam substantially to the plane of said cathode by means of a focusing electrode having a lower end substantially coplanar with said cathode, lowering a rod of melt stock at anode potential alongside said focusing electrode until the lower end thereof extends below the lower end of said focusing electrode, thereby initiating a strong flow of current from the cathode to the material within said mold and melting said material, and raising the lower end of said rod above the lower end of said focusing electrode as gaseous matter from the melt ionizes and forms a plasma.

References Cited in the file of this patent
UNITED STATES PATENTS

| | | |
|---|---|---|
| 2,771,568 | Steigerwald | Nov. 20, 1956 |
| 2,880,483 | Hanks et al. | Apr. 7, 1959 |
| 2,942,098 | Smith | June 21, 1960 |
| 3,087,211 | Howe | Apr. 30, 1963 |